United States Patent Office 2,743,233
Patented Apr. 24, 1956

2,743,233

OIL-BASE DRILLING MUDS AND METHODS OF DRILLING WITH SAME

Henry B. Fisher, Bartlesville, Okla., assignor to Phillips Petroleum Company, a corporation of Delaware No Drawing. Application January 3, 1952,
Serial No. 264,831

17 Claims. (Cl. 252—8.5)

This invention relates to drilling muds. In certain of its specific aspects, the invention pertains to improved methods of drilling wells in the earth. Preferred embodiments of the invention relate to oil-base drilling muds having low fluid loss and increased viscosities. One aspect of the invention pertains to oil-water emulsions used as drilling muds.

Various advantages of using oil base drilling muds in the rotary drilling of bore holes in the earth over the more common usage of water base drilling muds, have been known for some time. In summary, it can be said that under certain conditions, one or more of the following advantages make oil-base muds more desirable than water-base mud. Drilling fluids weighing less than about 8 pounds per gallon can be prepared with an oil base, and have proved advantageous in drilling and coring low pressure horizons. The penetration of the earthen formations by water is avoided. Cores can be recovered in an in situ condition, and in the presence of hydrous clays and bentonites no swelling or sloughing is experienced to reduce porosities or cause pipe sticking difficulties. The principal difficulties encountered in the use of oil base drilling fluids are probably those of handling, fire hazard, and the intrinsic cost per barrel, since oil is much more expensive than water. Most materials which heretofore have been added to oils in order to produce satisfactory drilling muds have been of an intense black color, e. g. lamp black and asphalt of various kinds, and drilling crews have a strong resistance to handling such materials. Not just any material can be added to an oil for the purpose of making a drilling mud, because the material to be added must not only increase the viscosity, though not to too great an extent, and decrease the fluid loss, but must also be dispersible in the oil, and above all must not be of such a nature as to clog the formations drilled through.

An object of this invention is to provide improved drilling muds. Another object is to provide improved oil-base drilling muds. A further object of the invention is to provide oil-water emulsion muds. Another object is to provide improved drilling methods. A further object is to improve the method of depositing filter cakes on the walls of wells being drilled in the earth. Yet another object is to provide an oil-base drilling mud with a very low fluid loss. An additional object of the invention is to increase the viscosity of petroleum oils to such an extent that they can be used as drilling muds. Other objects and advantages of the invention will be apparent to one skilled in the art from the accompanying disclosure and discussion.

In accordance with preferred embodiments of my invention, very satisfactory oil-base drilling muds are prepared by dispersing in a topped crude oil, or other suitable oil, a plastic material obtained by the hydrogenation of a viscous liquid or solid diene polymer. A preferred plastic material is that obtained by the catalytic hydrogenation of a solid polybutadiene elastomer. The unsaturation of the synthetic elastomer can be partially or completely saturated by hydrogenation. For example, a solid polybutadiene obtained by the emulsion polymerization of a monomeric material composed solely of 1,3-butadiene, and having a Mooney viscosity of 30 to 60, can be subjected to catalytic hydrogenation at 2000 pounds pressure in the absence of a Raney nickel catalyst while dissolved in a concentration of five per cent in a methylcyclohexane solvent, at a temperature and time effecting approximately 50 per cent saturation, so that the unsaturation originally being in the neighborhood of 80 to 95 per cent (based on the theoretical assumption value of one olefin bond per monomer unit in the polymer) is reduced to say 45 per cent. The resulting hydrogenated material, dissolved in a crude oil in a quantity of only 2 pounds per barrel of oil, increases the viscosity of the oil from about 3 centipoises to 20, and decreases the fluid loss from the extremely high values typical of a crude oil to a value of 2 cc. in 30 minutes at 100 pounds per square inch pressure by the standard A. P. I. Code 29 method of test. While addition of water to this admixture forms a rather unstable emulsion, it can be used as an emulsion drilling mud. The admixture of oil with hydrogenated polybutadiene, or oil with hydrogenated polybutadiene plus water, can be used alone as drilling mud, although if desired the usual weighting agents, clays and the like, can also be incorporated. Of course cuttings from the earth formations penetrated by the bit will be in the drilling fluid.

The oils used in my invention are usually petroleum oils, although other oleaginous materials such as vegetable and animal oils can be used though seldom with economic advantage. The oils in any event should contain at least some material boiling above the gasoline boiling range, i. e. above 400° F. at atmospheric pressure. Oils with too high a content of highly volatile hydrocarbons in the gasoline boiling range are undesirable because of the danger of fire, and because of the low viscosity. Preferred oils are topped crude oils, gas oils, kerosene, diesel fuels, and the like. An important advantage of my oil-base drilling muds is that the viscosity increases, obtained on adding the hydrogenated diene polymer to the oil are retained to a very good extent even at elevated temperatures. Furthermore, fluid losses are extremely low. The hydrogenated diene polymers which are used are applicable to a wide variety of oils of varying aromaticity, and thus differ from a number of previously known materials which are useful only in certain types of oils. The efficacy of the hydrogenated polybutadienes and like materials is increased by increasing the stirring time, by heating, and by aging, presumably because of better dispersion in the oil thus obtained. The marked advantages, including good viscosity and very low fluid loss, which I have obtained are quite surprising, because to obtain comparable characteristics requires several times the quantity of unhydrogenated synthetic elastomers. Thus, a butadiene-styrene crumb synthetic rubber containing carbon black (carbon black has previously been suggested as a good additive for oil base drilling muds) at a dosage of 1.75 pounds per barrel of crude oil increased the viscosity only to 9 centipoises and gave a fluid loss of 17.5. Increasing the dosage to 17.5 pounds per barrel brought the viscosity up to 43 and the fluid loss to 1. Thus, the cost of supplying such a material rather than the materials of the present invention is readily apparent.

The hydrogenated heavy polydienes which I add to oils to make my drilling fluids differ quite considerably from the synthetic diene polymer before hydrogenation. Thus, when a solid polymer is hydrogenated, the resulting material is thermoplastic, and its solubility in common elastomer solvents is considerably decreased. They are tougher and have greater tensile strength than the starting elastomers. A typical hydrogenated solid polybutadiene is a white solid material when precipitated from solution, very similar in appearance to asbestos fibers. These materials are all light colored, thus are not objectionable to drillers as are asphalts when added to oils. Liquid polymers of diolefins can also be hydrogenated and used in preparing my drilling muds. In such case the hydrogenated material is usually also liquid, and more easily dispersed in the oil than the solids, although a larger quantity is ordinarily needed to obtain the same effect. Starting polymers ranging from syrupy liquids through semi-solids to solids can be hydrogenated to give hydrogenated products which also range from viscous liquids to semi-solids to solids.

Starting materials which can be hydrogenated include solid and liquid polymers and copolymers prepared by either mass or emulsion polymerization methods. Said polymers and copolymers can be prepared by known methods such as the polymerization of a polymerizable aliphatic conjugated diolefin or a mixture of such a conjugated diolefin with lesser amounts of one or more other compounds containing an active vinylidene group, $CH_2=C<$, which are copolymerizable therewith such as aryl olefins, acrylic and substituted acrylic acids, esters and the like. Examples of polymers prepared from conjugated diolefins include polybutadiene, polypentadiene, polymethylpentadiene and the like. Examples of polymers prepared by copolymerization of mixtures of monomers, at least one of which is a conjugated diolefin, include copolymers of butadiene-styrene, butadiene-isoprene, butadiene-methylacrylate, butadiene-ethylacrylate, isoprenestyrene, and the like.

Since preparation of the foregoing polymers is now well within the skill of the art, details of the particular emulsion recipes, or particular methods of mass polymerization, such as using finely divided sodium as catalyst, will not be given here as they are unnecessary to a complete understanding of the present invention.

The polymers in question are hydrogenated while in the form of a solution or dispersion in a suitable solvent which is preferably inert to hydrogenation, such as saturated cyclic hydrocarbons, for example cyclohexane or methylcyclohexane. Aromatic hydrocarbons, cyclic ethers, and paraffin hydrocarbon solvents, for example benzene, toluene, isooctane, isoheptane, n-heptane, dioxane, and the like, preferably boiling above atmospheric temperature, can be used.

Suitable hydrogenation catalysts are, for example, Raney nickel, nickel-kieselguhr, copper chromite, molybdenum sulfide, finely divided platinum, finely divided palladium, platinum oxide, and copper chromium oxide. One suitable catalyst is nickel-kieselguhr having a reduced nickel content of from 30 to 80 weight per cent. The more active catalysts can be used in quantities of 2 to 20 per cent of the polymer to be hydrogenated.

The hydrogenation can be carried out from room temperature, for instance 75° F., up to 400° F. and even considerably higher, say 600 to 700° F. Hydrogen pressures in the range of atmospheric to 3000 pounds per square inch or more can be used. A suitable temperature is 200 to 300° F. in most instances. Hydrogenation can take place for a period of from one to several hours, say 2 to 8 hours on up to 24 hours. The plastic materials which I add to oils for the purpose of making drilling muds can be prepared by reducing the original unsaturation of a polymer by at least 10 per cent. In many instances, it is desirable to reduce the unsaturation by at least 50 per cent or more. In fact, products which are substantially completely saturated are satisfactory. Ordinarily a residual unsaturation in the range of 20 to 30 per cent is very good for my purposes.

Further and more detailed descriptions of methods of preparing the polymers and of hydrogenating same can be found in the copending applications of Rufus V. Jones and Charles W. Moberly, Serial Nos. 202,797, 201,880, and 201,881, the former filed December 26, 1950, and the latter two filed December 20, 1950, all now abandoned.

The data presented in the table following show some of the properties of some preferred drilling muds of the present invention, and illustrate how properties can be varied by choice of materials, quantities and preparation methods.

*Additive A.*—This material was prepared by hydrogenating a solid polybutadiene prepared by emulsion polymerization of monomer consisting of butadiene. The polymerization was effected at 41° F., the latex coagulated, and the crumbs washed and dried. The crumbs (250 g.) were dispersed in 3 liters methylcyclohexane, to which was then added 500 ml. of a suspension of a reduced nickel-kieselguhr catalyst (about 45 g.). This mixture was charged into a reactor and rinsed into the reactor with 1500 ml. of methylcyclohexane. The reactor was flushed to remove air and then pressured with hydrogen to 1400 p. s. i. g. Heat was applied and the reactor was heated to 200° F. for 23 hours. The catalyst was removed by filtration, and the product concentrated and precipitated by adding to alcohol. The solid product was dried in a vacuum oven at 150° F., yield was 222 g. The unsaturation of the product was 44.8 per cent.

*Additive B.*—A viscous liquid polybutadiene having the consistency of cold molasses and prepared by mass polymerization of butadiene with sodium catalyst was made up as a 9.2 weight per cent dispersion in methylcyclohexane. This dispersion was mixed with a 500 ml. dispersion of reduced nickel-kieselguhr catalyst (about 45 g.). This mixture was charged into an autoclave. The air was removed by flushing with hydrogen, and the reactor thus pressured with hydrogen to 1250 p. s. i. g. The reactor was heated to 200° F. for about three hours. The catalyst was removed, the solution concentrated and precipitated from alcohol and dried in vacuum at 150° F. The unsaturation of the polymer was reduced from 84.3 per cent to 8.7 per cent. A yield of 255 g. of product was obtained. This hydrogenated polybutadiene was a viscous liquid similar in consistency to the starting polybutadiene.

The following additives were not hydrogenated.

*Samples 23–25.*—The additive used in these tests was a rubbery emulsion copolymerizate of butadiene with a lesser weight of styrene, used in the form of crumbs containing furnace carbon black.

*Sample 26.*—The additive used in this test was a rubbery emulsion copolymerizate of butadiene with a lesser weight of styrene, used in the form of crumbs but not containing carbon black.

*Sample 27.*—The additive used in this test was a viscous liquid polybutadiene prepared by sodium catalyzed mass polymerization.

The data presented in the following table were obtained on mixtures of various additives with Burbank crude oil. The oil alone, without any additive, had a viscosity of 3 centipoises and a very high fluid loss of about 150 cc. in 5 minutes or less.

Table

| Sample number | Weight additive, #/bbl. | Stirring time, hours | Room temperature data | | | Elevated temperature data | | | | Remarks regarding sample |
|---|---|---|---|---|---|---|---|---|---|---|
| | | | Viscosity (centipoises) | Gel strength (grams) 0-10 min. | Fluid loss, cc., 30 min. 100 p.s.i. | Viscosity (centipoises) | Temp., °C. | Fluid loss, cc., 30 min. 100 p.s.i. | Temp., °C. | |
| 1. Additive A | 9.3 | | 66 | | | | | | | Limited solubility. |
| 2. Sample 1 aged overnight | 9.3 | | 91 | 0-0 | 0.0 | 37 | 77 | | | Do. |
| 3. (a). Add 35 cc. H₂O to 100 cc. sample 2 | | | | | 0.0 | | | | | Do. |
| (b). Refiltered using wet filter paper—slight quantity water then 1 drop of oil on fluid loss test. | | | | | | | | | | |
| (c). Added untreated crude to press from (a) above, 10 cc. oil in 30 minutes. | | | | | | | | | | |
| 4. Additive A | 2.3 | 1.5 | 10 | 0-0 | | | | | | Not all dispersed. |
| 5. Additive A | 2.3 | 3.0 | 20 | 0-0 | | | | | | Do. |
| 6. Additive A heated to 150° F. 1 hr; aged 20 hours | 2.3 | | 20 | 0-0 | 2.0 | | | | | Appears dispersed, some flocculation. |
| 7. Additive A | 4.6 | 1.5 | 25 | 0-0 | | | | | | Not all dispersed. |
| 8. Additive A | 4.6 | 3.0 | 25 | 0-0 | | | | | | Do. |
| 9. Additive A heated to 150° F. 1 hr | 4.6 | | 56 | 0-0 | 4.2 | 23 | 53 | | | Appears dispersed. |
| 10. Additive A contains 50 cc. benzene/150 cc. crude | 4.6 | 1.5 | 11 | 0-0 | | | | | | Not all dispersed. |
| 11. Additive A heated to 150° F. 1 hour | 4.6 | | 45 | 0-0 | 5.4 | | | | | Appears dispersed, some flocculation. |
| 12. Additive A | 7.0 | 2.0 | | 0-0 | 8.5 | | | 18.3 | 77 | Not completely dispersed. |
| 13. Composite samples 4 to 11 + 20% H₂O | | 0.5 | 64 | 0-0 | 10.6 | | | | | Appears to be water-in-oil emulsion. |
| (a) Above separated into 2 phases, oil and brown emulsion: | | | | | | | | | | |
| Decanted crude from (a) | | | 44 | 0-0 | 17.0 | | | | | |
| Emulsion from (a) | | | 120 | 0-0 | 4.5 | | | | | |
| 14. Additive A | 5.0 | 2 | 7.5 | 0-0 | (¹) | | | | | |
| 15. Additive A | 11.8 | 2 | 10.5 | 0-0 | (¹) | | | | | |
| 16. Additive A | 23.4 | 2 | 19.0 | 0-0 | (¹) | | | | | |
| 17. Composite of samples 14 to 16 | | | | 0-0 | (¹) | | | | | |
| 18. Sample 17 aged overnight | | | 14.0 | 0-0 | (¹) | | | | | |
| 19. Sample 17 aged 9 days | | | | 0-0 | (¹) | | | | | |
| 20. Additive B | 46.0 | 2 | 35 | 0-0 | (¹) | | | | | Some settling. |
| 21. Sample 20 heated to 150° F. 1 hr | 46.0 | | 44 | 0-0 | (¹) | | | | | Dispersal easy. |
| 22. Sample 21 aged 9 days | 46.0 | | 40 | 0-0 | (¹) | | | | | |
| 23. Butadiene-styrene crumb rubber containing furnace black | 1.75 | 2 | 9 | 0-0 | 17.5 | 3.0 | 60 | 24.8 | 75 | |
| 24. Butadiene-styrene crumb rubber containing furnace black (200 cc. crude + 20 cc. toluene) | 1.75 | 2 | 8 | 0-0 | 15.5 | 3.0 | 55 | 42.0 | 65 | |
| 25. Butadiene-styrene crumb rubber containing furnace black | 17.50 | 2 | 43 | 0-0 | 1.0 | 19.0 | 73 | 2.0 | 67 | Rubber not completely dispersed. |
| 26. Butadiene-styrene crumb rubbery copolymer | 17.50 | 2 | 21 | 0-0 | 15.0 | | -142 | cc./4 min. | 65 | Very limited solubility. |
| 27. Sodium catalyzed liquid polybutadiene | 17.50 | 2 | 14 | 0-0 | 12.0 | 2 | 80 | 156 | 62 | |

¹ Room temperature, fluid loss values, cc.

| 1 min. | 5 min. | 15 min. | 30 min. |
|---|---|---|---|
| 9.0 | 11.5 | 12.6 | 13.4 |
| 7.0 | 8.0 | 8.9 | 9.7 |
| 2.5 | 3.0 | 3.3 | 3.7 |
| 3.0 | 3.9 | 4.2 | 4.3 |
| 4.0 | | 6.4 | 7.2 |
| 1.5 | 2.1 | 2.9 | |
| 0.3 | 0.6 | 0.9 | 1.1 |
| 0.8 | | 2.5 | 3.3 |

I claim:

1. A drilling mud comprising an oil at least part of which boils above 400° F., at least one drilling mud component selected from the group consisting of water, clay, weighting agents, and earth cuttings, and at least one member of the group consisting of a hydrogenated heavy polymer of an acyclic low molecular weight conjugated diene and a heavy copolymer of a mixture of monomers at least one of which is an acyclic low molecular weight conjugated diene.

2. A drilling mud comprising an oil at least part of which boils above 400° F., water, and a hydrogenated heavy polymer of an acyclic low molecular weight conjugated diene.

3. A drilling mud comprising an oil at least part of which boils above 400° F., at least one drilling mud additive selected from the group consisting of water, clay, weighting agents and earth cuttings, and a catalytically hydrogenated heavy polymer of butadiene.

4. A drilling mud comprising an oil at least part of which boils above 400° F., at least one drilling mud additive selected from the group consisting of water, clay, weighting agents and earth cuttings, and a catalytically hydrogenated heavy polymer prepared by emulsion polymerization of butadiene.

5. A drilling mud comprising an oil at least part of which boils above 400° F., at least one drilling mud additive selected from the group consisting of water, clay, weighting agents and earth cuttings, and a catalytically hydrogenated heavy polymer prepared by sodium catalyzed mass polymerization of butadiene.

6. A drilling mud according to claim 4 in which said polymer is a solid.

7. A drilling mud according to claim 5 in which said polymer is a solid.

8. A drilling mud according to claim 1 in which said polymer has been at least 50% hydrogenated.

9. A drilling mud comprising a hydrocarbon oil at least part of which boils above 400° F., at least one drilling mud additive selected from the group consisting of water, clay, weighting agents and earth cuttings, and a material prepared by polymerizing an acyclic low molecular weight conjugated diolefin containing from 4 to 6 carbon atoms to form a viscous liquid to solid polymer and catalytically hydrogenating said polymer in a light liquid hydrocarbon solvent until at least 10% of its original unsaturation is saturated.

10. An oil base drilling mud comprising a hydrocarbon oil at least most of which boils above the gasoline range, and incorporated therein sufficient of a hydrogenated heavy polymer of a conjugated diene containing from 4 to 6 carbon atoms to reduce the fluid loss of said oil and to increase the viscosity of said oil but not to such an extent as to make said drilling mud uncirculatable.

11. A drilling mud according to claim 1 in which said polymer is a copolymer of a conjugated diene and at least one compound containing a $CH_2=C$ group and copolymerizable therewith.

12. A drilling mud according to claim 11 in which said polymer is a solid copolymer of a major proportion of butadiene and a minor proportion of styrene.

13. In a process for drilling a well with well drilling tools wherein there is circulated in the well an oil base drilling fluid, the method of forming a filter cake on the wall of said well to decrease the loss of fluid from said drilling fluid contained therein into surrounding earthen formations which comprises incorporating in said oil base at least one member of the group consisting of a hydrogenated heavy polymer of an acyclic low molecular weight conjugated diene and a heavy copolymer of a mixture of monomers at least one of which is an acyclic low molecular weight conjugated diene in an amount sufficient to lower the fluid loss through the filter cake and to increase the viscosity of the oil base drilling fluid but not to such an extent as to render same uncirculatable, and contacting said wall of said well with the resulting drilling fluid to form said filter cake thereon.

14. In a process for drilling a well with well drilling tools wherein there is circulated in the well an oil base drilling fluid, the method of forming a filter cake on the wall of said well to decrease the loss of fluid from said drilling fluid contained therein into surrounding earthen formations which comprises incorporating in said oil base a catalytically hydrogenated solid polymer prepared by emulsion polymerization of butadiene in an amount sufficient to lower the fluid loss through the filter cake and to increase the viscosity of the oil base drilling fluid but not to such an extent as to render same uncirculatable, and contacting said wall of said well with the resulting drilling fluid to form said filter cake thereon.

15. In a process for drilling a well with well drilling tools wherein there is circulated in the well an oil base drilling fluid, the method of forming a filter cake on the wall of said well to decrease the loss of fluid from said drilling fluid contained therein into surrounding earthen formations which comprises incorporating in said oil base a material prepared by polymerizing a conjugated diolefin containing from 4 to 6 carbon atoms to form a viscous liquid to solid polymer and catalytically hydrogenating said polymer in a light liquid hydrocarbon solvent until at least 10% of its original unsaturation is saturated, in an amount sufficient to lower the fluid loss through the filter cake and to increase the viscosity of the oil base drilling fluid but not to such an extent as to render same uncirculatable, and contacting said wall of said well with the resulting drilling fluid to form said filter cake thereon.

16. A drilling mud according to claim 9 in which the hydrogenation is continued until 50% of the original unsaturation is saturated.

17. The process of claim 15 in which the hydrogenation is continued until 50% of the original unsaturation is saturated.

References Cited in the file of this patent

UNITED STATES PATENTS

| | | |
|---|---|---|
| 2,049,019 | Pier et al. | July 28, 1936 |
| 2,217,926 | Van Campen | Oct. 15, 1940 |
| 2,449,949 | Morris et al. | Sept. 21, 1948 |
| 2,605,222 | Jones | July 29, 1952 |